(12) United States Patent
Sporrer et al.

(10) Patent No.: US 11,397,415 B2
(45) Date of Patent: Jul. 26, 2022

(54) CONTROLLING AN AGRICULTURAL IMPLEMENT USING A METRIC PRIORITY

(71) Applicant: Deere & Company, Moline, IL (US)

(72) Inventors: Adam D. Sporrer, Huxley, IA (US); Ricky B. Theilen, Bettendorf, IA (US); Lucas B. Larsen, Ankeny, IA (US); Jeremy D. Krantz, Polk City, IA (US)

(73) Assignee: Deere & Company, Moline, IL (US)

( * ) Notice: Subject to any disclaimer, the term of this patent is extended or adjusted under 35 U.S.C. 154(b) by 16 days.

(21) Appl. No.: 17/143,514

(22) Filed: Jan. 7, 2021

(65) Prior Publication Data

US 2021/0200172 A1 Jul. 1, 2021

Related U.S. Application Data

(63) Continuation of application No. 15/896,757, filed on Feb. 14, 2018, now Pat. No. 10,915,076.

(51) Int. Cl.
| | |
|---|---|
| *G05B 13/02* | (2006.01) |
| *G05B 15/02* | (2006.01) |
| *A01D 41/00* | (2006.01) |
| *G06F 3/0481* | (2022.01) |
| *G06F 3/0484* | (2022.01) |
| *B60W 10/06* | (2006.01) |
| *B60W 50/00* | (2006.01) |
| *G06F 3/04817* | (2022.01) |
| *G06F 16/2457* | (2019.01) |
| *G05B 19/042* | (2006.01) |

(Continued)

(52) U.S. Cl.
CPC ............ *G05B 15/02* (2013.01); *A01B 79/005* (2013.01); *G05B 19/042* (2013.01); *G06F 3/04817* (2013.01); *G06F 16/24578* (2019.01); *G05B 2219/45017* (2013.01); *G06Q 10/06* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 8,775,032 B2 * | 7/2014 | Wolfcarius | A01D 41/1274 701/50 |
| 9,002,594 B2 * | 4/2015 | Wilken | G05B 11/06 701/50 |

(Continued)

FOREIGN PATENT DOCUMENTS

| | | |
|---|---|---|
| EP | 0838141 A2 | 4/1998 |
| FR | 2723792 A1 | 2/1996 |

OTHER PUBLICATIONS

Extended European Search Report Application No. 19151677.2 dated Jul. 16, 2019, 7 pages.

(Continued)

*Primary Examiner* — Adam D Tissot
*Assistant Examiner* — Laura E Linhardt
(74) *Attorney, Agent, or Firm* — Christopher J. Volkmann; Kelly, Holt & Christenson, PLLC

(57) ABSTRACT

A metric priority is accessed, which identifies a priority of a plurality of different control metrics that are used in controlling an agricultural implement. Control signals are generated to control the implement to bring the metrics within corresponding predefined ranges in descending order of priority.

20 Claims, 14 Drawing Sheets

(51) Int. Cl.
*A01B 79/00* (2006.01)
*G06Q 10/06* (2012.01)
*G07C 5/00* (2006.01)

(56) References Cited

U.S. PATENT DOCUMENTS

| | | |
|---|---|---|
| 9,892,376 B2 | 2/2018 | Pfeiffer et al. |
| 10,915,076 B2 | 2/2021 | Sporrer et al. |
| 2006/0271243 A1 | 11/2006 | Behnke et al. |
| 2015/0199630 A1 | 7/2015 | Dohn et al. |
| 2016/0052525 A1* | 2/2016 | Tuncer ................ B60W 50/085 |
| | | 701/50 |
| 2017/0235471 A1* | 8/2017 | Schøler ................ G06F 3/0481 |
| | | 715/772 |
| 2018/0359919 A1 | 12/2018 | Blank et al. |
| 2018/0364652 A1* | 12/2018 | Blank ...................... H04Q 9/00 |

OTHER PUBLICATIONS

Prosecution History for U.S. Appl. No. 15/896,757 including: Corrected Notice of Allowance dated Dec. 9, 2020, Notice of Allowance dated Oct. 7, 2020, Amendment dated Aug. 17, 2020, Non-Final Office Action dated May 15, 2020, Amendment with RCE dated Jan. 29, 2020, Final Office Action dated Oct. 29, 2019, Amendment dated Aug. 5, 2019, Non-Final Office Action dated Apr. 5, 2019, and Application and Drawings filed Feb. 14, 2018, 186 pages.

* cited by examiner

| PRIORITY | 1 | 2 | 3 | 4 | 5 |
|---|---|---|---|---|---|
| | SPEED (MPH) | FUEL CONSUMPTION (GAL/ACRE) | TOOL DEPTH (IN) | WHEEL SLIP (%) | QUALITY OF JOB (1-5) |
| HIGH | 7 | 1.2 | 4 | 15 | 5 |
| TARGET | 6 | 1 | 3 | 10 | 4 |
| LOW | 5 | 0.8 | 2 | 5 | 3 |

FIG. 3A

CONTROLLING AN AGRICULTURAL IMPLEMENT USING A METRIC PRIORITY

CROSS-REFERENCE TO RELATED APPLICATION

The present application is a continuation of and claims priority of U.S. patent application Ser. No. 15/896,757, filed Feb. 14, 2018, the content of which is hereby incorporated by reference in its entirety.

FIELD OF THE DESCRIPTION

The present description relates to controlling agricultural equipment. More specifically, the present description relates to controlling an agricultural implement using a metric priority.

BACKGROUND

There are a wide variety of different types of agricultural machines. Some agricultural machines include implements that are supported (e.g., towed) by a vehicle, such as a tractor. Operator input mechanisms on the towing vehicle often allow an operator to provide control inputs to control different functionality on the implement being towed.

On current implements, there are many different types of adjustments that the operator can make. Also, the operator can make different adjustments to the functionality on the towing vehicle (e.g., the operator can provide a variety of different inputs to control the functionality of the tractor). The control inputs to both the implement and the tractor can affect different performance criteria in performing the particular operation that the implement is being used for. A user can currently make these types of adjustments to the tractor and to the implement, on the go. However, it can be difficult for the operator to know whether those adjustments have achieved optimal (or even acceptable) settings so that the operation they are performing is being performed in an acceptable way.

Also, some current systems allow the operator to provide settings for a variety of different metrics on both the implement and the tractor. A control system attempts to maintain those parameters at the pre-set level. However, while the control system may control the implement and tractor to maintain one of the parameters at the pre-set level, this may sacrifice the performance with respect to the other parameters. Thus, these types of control systems often result in machine control that achieves undesirable (or unacceptable) performance.

The discussion above is merely provided for general background information and is not intended to be used as an aid in determining the scope of the claimed subject matter.

SUMMARY

A metric priority is accessed, which identifies a priority of a plurality of different control metrics that are used in controlling an agricultural implement. Control signals are generated to control the implement to bring the metrics within corresponding predefined ranges in descending order of priority.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3A is one example of a user interface display showing a metric priority with a target value and a threshold range.

DETAILED DESCRIPTION

Figure 1:
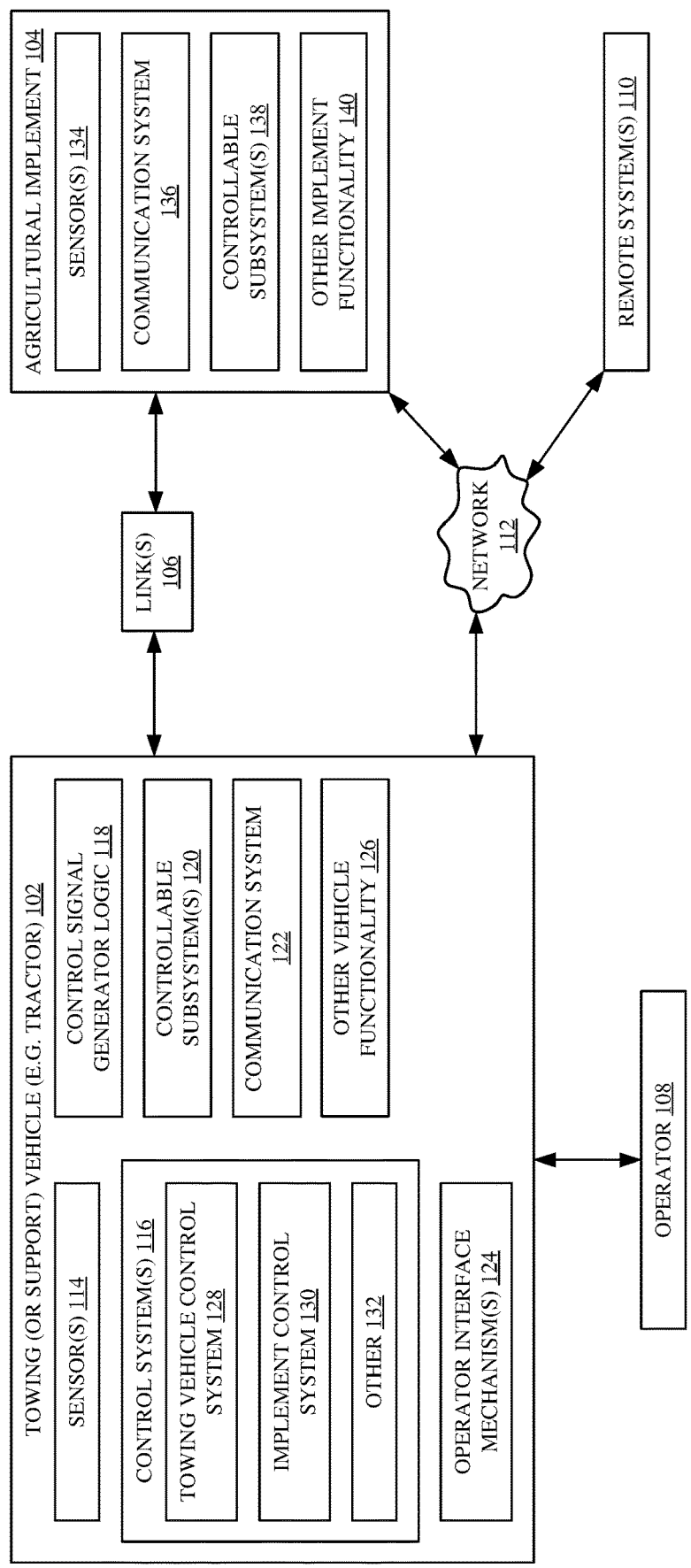
FIG. 1 is a block diagram showing one example of an agricultural towing vehicle and an agricultural implement.

FIG. 1 is a block diagram showing one example of an agricultural implement architecture 100. Architecture 100 shows towing (or support) vehicle 102 that is towing agricultural implement 104. Vehicle 102 is attached to implement 104 by one or more links 106. Links 106 can include mechanical links, a hydraulic link that provides hydraulic fluid under pressure, an electronic link (such as a wire or wire harness assembly, or a wireless link) that carries electronic information, a power takeoff, or other mechanical, electrical, hydraulic, wireless, wired or wireless links or other links. In one example, vehicle 102 is a tractor, while implement 104 is a tillage implement. This is just an example, and vehicle 102 and implement 104 can be a wide variety of other items as well.

FIG. 1 also shows that, in one example, operator 108 is positioned to operate vehicle 102. Operator 108 can be local to vehicle 102, and sitting in an operator compartment on vehicle 102, or a remote operator.

FIG. 1 also shows that, in one example, vehicle 102 and/or implement 104 can be connected to communicate with one or more remote systems 110 over a network 112. Network 112 can be a local area network, a wide area network, a cellular communication network, a near field communication network, or any of a wide variety of other networks or combinations of networks. The one or more remote systems 110 can include a remote data storage system, a remote computing system (such as a data center, a hosted service, a website, etc.) or other systems.

In the example shown in FIG. 1, vehicle 102 illustratively includes one or more sensors 114, control system 116, control signal generator logic 118, one or more controllable subsystems 120, communication system 122, operator interface mechanisms 124, and it can include a wide variety of other vehicle functionality 126. Control system 116 can include towing vehicle control system 128, implement control system 130, and it can include a wide variety of other items 132.

Agricultural implement 104 illustratively includes one or more sensors 134, communication system 136, a set of controllable subsystems 138, and it can include a wide variety of other implement functionality 140. It will also be noted that implement 104 can include a control system which, itself, generates control signals to control the controllable subsystems 138 based upon inputs from sensors 134 and from vehicle 102 (received over links 106). The control system for implement 104 is shown as residing entirely on vehicle 102, in FIG. 1, for the sake of example only. It will be noted, of course, that the control system for implement 104 can reside on implement 104, or it can be split between vehicle 102 and implement 104, or it can reside elsewhere.

Before describing the overall operation of architecture 100 in more detail, a brief overview of some of the items in architecture 100, and their operation, will first be provided. Sensors 114 can sense a wide variety of different types of variables on towing vehicle 102, or in the environment of towing vehicle 102. Operator interface mechanisms 124 illustratively provide a way for operator 108 to interact with vehicle 102. For instance, mechanisms 124 can include linkages, levers, joysticks, buttons, steering wheel, pedals, a microphone (where speech recognition is included on vehicle 102), a touch sensitive screen (so that operator 108 can interact with vehicle 102 through touch inputs), one or more visual output devices, haptic feedback devices, audio output devices, or a wide variety of other mechanisms. Thus, operator 108 can interact with vehicle 102 through operator interface mechanisms 124 to control and manipulate vehicle 102, and parts of agricultural implement 104.

Towing vehicle control system 128 illustratively receives inputs from sensors 114 and operator 108 (through mechanisms 124) and controls control signal generator logic 118 to generate control signals that control various controllable subsystems 120 of vehicle 102. The controllable subsystems 120 can include such things as a propulsion system, a steering system, a hydraulic system, a mechanical system, an electronic system, etc.

Implement control system 130 can illustratively receive inputs from sensors 114 and/or sensors 134 (on implement 104) and can further receive inputs from operator 108 (through mechanisms 124). Implement control system 130 can then use control signal generator logic 118 to generate control signals in order to control controllable subsystems 138 on implement 104. Implement control system 130, and its operation, are described in greater detail below with respect to FIG. 2. Briefly, however, implement control system 130 illustratively uses operator interface mechanisms 124 to generate a user interface that allows operator 108 to select various metrics that can be used to control implement 104. Operator 108 can then set a target value for each of the metrics, and a target range (e.g., defined by upper and lower threshold values) for each metric. Operator 108 can also illustratively set a metric priority so that implement control system 130 controls implement 104, based on the metrics, in descending order of priority. For instance, control system 130 can control tractor 102 and/or implement 104 to maintain the highest priority metric at least within the target range defined by the threshold values before moving on to the next priority metric. It then controls tractor 102 and/or implement 104 to maintain the next priority metric at its target level (or at least within the target range defined by its corresponding threshold values) and then rechecks the higher priority metrics to ensure that they are still within their target ranges. Thus, it does not control implement 104 based on lower priority metrics unless all of the higher priority metrics can still be maintained within their target ranges. Again, this is described in greater detail below.

Sensors 134 can sense a variety of different variables relative to implement 104. For instance, they can sense the configuration of, or settings on, implement 104. They can sense characteristics of the soil over which implement 104 is traveling (or with which it is engaged), the environment around implement 104, geographic position, etc. The sensor signals generated by sensors 134 can be transmitted back to implement control system 130 over links 106.

Controllable subsystems 138 on implement 104 can vary widely, based upon the type of implement that it is. For instance, the controllable subsystems may be a first set of subsystems where implement 104 is a tillage implement. However, they can be a different set of subsystems where implement 104 is a planter. Again, these are examples only.

Communication systems 122 (on vehicle 102) and 136 (on implement 104) illustratively allow vehicle 102 and implement 104 to communicate with one another over links 106. Therefore, whatever information is to be transmitted over links 106, the transmission will illustratively be enabled by the communication systems. Similarly, in one example, both communication systems 122 and 136 (or either of them) illustratively allow vehicle 102, or implement 104, respectively, to communicate with one another or with remote systems 110 over network 112. Thus, depending on the type of network or combination of networks that make up network 112, communication systems 122 and/or 136 are illustratively configured to generate and receive communications over that type of network or combination of networks.

Figure 2:
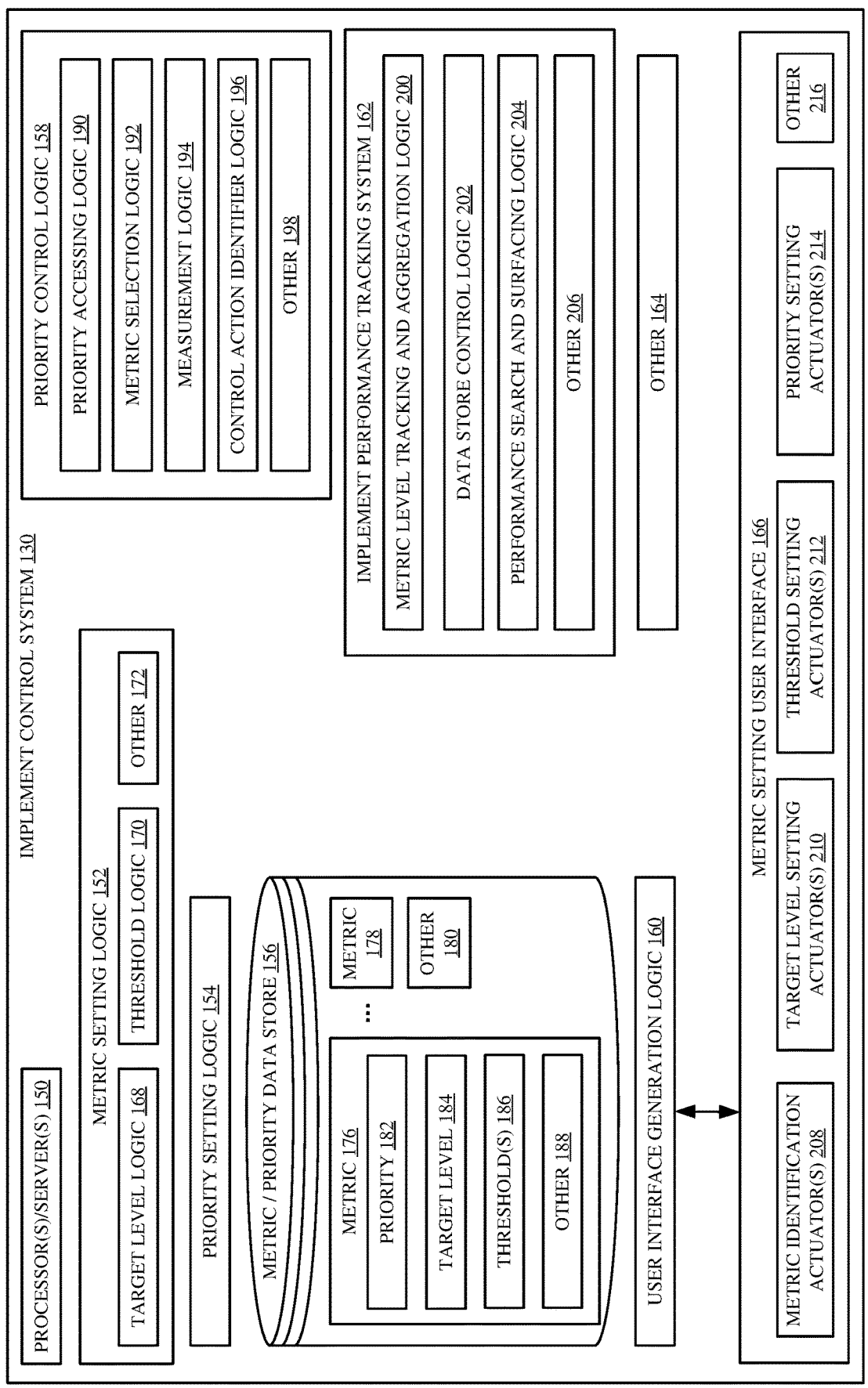
FIG. 2 is a block diagram showing one example of an implement control system, in more detail.

FIG. 2 is a block diagram showing one example of implement control system 130, in more detail. In the example shown in FIG. 2, implement control system 130 illustratively includes one or more processors or servers 150, metric setting logic 152, priority setting logic 154, metric/priority data store 156, priority control logic 158, user interface generation logic 160, implement performance tracking system 162, and it can include other items 164. FIG. 2 also shows one example of a metric setting user interface 166 that can be generated by user interface generation logic 160.

Metric setting logic 152 can include target level logic 168, threshold logic 170, and it can include other items 172. Metric/priority data store 156 can store a plurality of metric records 176-178, and it can store other items 180. Metric records 176-178 each illustratively include a priority identifier 182 that identifies a priority of the corresponding metric relative to the other metrics. It can include a target level 184 that defines a target level for the corresponding sensed metric (or a metric that is derived based on sensed values) and a set of thresholds 186. The set of thresholds can include a single threshold, or multiple thresholds that define a target window. The thresholds correspond to values for the corresponding metric. Each metric record 176-178 can include other items 188 as well.

It will also be noted that, while data store 156 shows separate metric records 176-178 for each metric, where the metric records include the priority, the information may be arranged differently in data store 156 as well. For instance, the metric records may include an identifier that identifies the metric, along with the target level and various thresholds. The priority may be stored separately in a separate data structure. These and other arrangements of data store 156 are contemplated herein. Priority control logic 158 can include priority accessing logic 190, metric selection logic 192, measurement logic 194, control action identifier logic 196, and it can include other items 198. Implement performance tracking system 162 can include metric level tracking and aggregation logic 200, data store control logic 202, performance search and surfacing logic 204, and it can include other items 206. The example of the metric setting user interface 166 shown in FIG. 2 can include one or more metric identification actuators 208, target level setting actuators 210, threshold setting actuators 212, priority setting actuators 214, and it can include other items 216. Before describing implement control system 130 in more detail, a brief overview of some of the items in implement control system 130, and their operation, will first be provided.

Metric setting logic 152 illustratively uses user interface generation logic 160 to generate metric setting user interfaces 166, and to detect interaction with the actuators on interface 166. This allows operator 108 to identify which metrics to use, and to set the target levels, thresholds and priority for the various metrics. For instance, target level logic 168 illustratively detects a user actuation of target level setting actuators 210 indicating a value for a particular selected metric that was previously selected by actuating metric identification actuators 208. Threshold logic 170 illustratively detects user interaction with threshold setting actuators 212, which may be used to set upper and lower thresholds for the metric value, to define a target window for that value. Priority setting logic 154 illustratively detects user interaction with priority setting actuators 214 to identify a priority of the various metrics being used by implement control system 130, in order to control implement 104. Metric setting logic 152 and priority setting logic 154 then interact with metric/priority data store 156 in order to store metric records 176-178 which identify the particular metric, its priority relative to other metrics, the target level value and the threshold values for the metric.

It will be noted, at this point, that the particular metrics being considered in controlling implement 104 may vary widely based on the type of implement. For instance, some examples of metrics can include speed, fuel consumption, tool depth, tool angle, tool down-pressure, wheel slip, job quality, among others. It will also be noted that the target values and the threshold values, as well as the priority, may be predefined, or they may be operator selected. Similarly, some of the values for the various metrics, and the corresponding priority, may be predefined while others are selectable. All of these and other arrangements are contemplated herein.

Priority control logic 158, once implement 104 is being operated, illustratively accesses the metric records in data store 156 and determines what actions need to be taken on implement 104 in order to maintain the values of the metrics, within their defined target window, based on their priority. Priority accessing logic 190 accesses the priority information in data store 156 to determine the order in which the metrics are arranged, based on upon the priority information. Metric selection logic 192 selects a metric, based upon the priority, and measurement logic 194 measures the variable or variables that are used in determining the value of the selected metric. Measurement logic 194 also compares the value of the selected metric against the target value, and the target range defined by the thresholds, to determine how the value of the metric currently compares to its target value and target range.

Control action identifier logic 196 illustratively identifies any control actions that need to be taken based upon the output of measurement logic 194. For instance, if the selected metric is outside of its target range, above the high threshold, then the implement (or tractor) may be controlled in a first way, according to a first set of control signals or settings. However, if it is out of range below the low threshold value, it may be controlled in a different way. The settings or control actions may be mapped to the metric values, or they may be determined dynamically. They may be determined in other ways as well. The control action identifier 196 illustratively generates an output indicative of the control actions to take, to either control signal generator logic 118 on vehicle 102, or to control signal generator logic on implement 104. The control signal generator logic generates control signals to control the controllable subsystems 138 on implement 104 (and/or the controllable subsystems 120 on vehicle 102) based upon the particular control actions that were identified.

Implement performance tracking system 102 illustratively tracks the various metrics that operator 108 has identified as being metrics that are to be used in the control operations, (or those that have been predefined), to identify a performance level, or performance characteristics, of implement 104. Metric level tracking and aggregation logic 200 illustratively tracks the metric levels for the various metrics and aggregates an amount of time (in terms of elapsed time, distance traveled, etc.) that the metrics were at the target level, within the target range, or above or below the target range. It can generate a time line or numeric or other record indicating this. Data store control logic 202 illustratively controls metric/priority data store 156 (or another data store) to store this information. Performance search and surfacing logic 204 illustratively receives a request to surface the performance information either from operator 108, or from a user of remote systems 110 (shown in FIG. 1) or from another user. Logic 204 then generates a user interface that is indicative of the performance of implement 104, based upon the metrics, their priority, their target and threshold levels, etc. In one example, the interface is interactive, in that the requesting user can interact with it in order to drill down into more detailed information corresponding to the performance of implement 104, or to drill up in order to access more abstract or general information corresponding to that performance, corresponding to the implement itself, corresponding to how the implement performs relative to other implements, etc. Some examples of surfacing the performance information are described below with respect to FIGS. 3A and 5.

Figure 3:
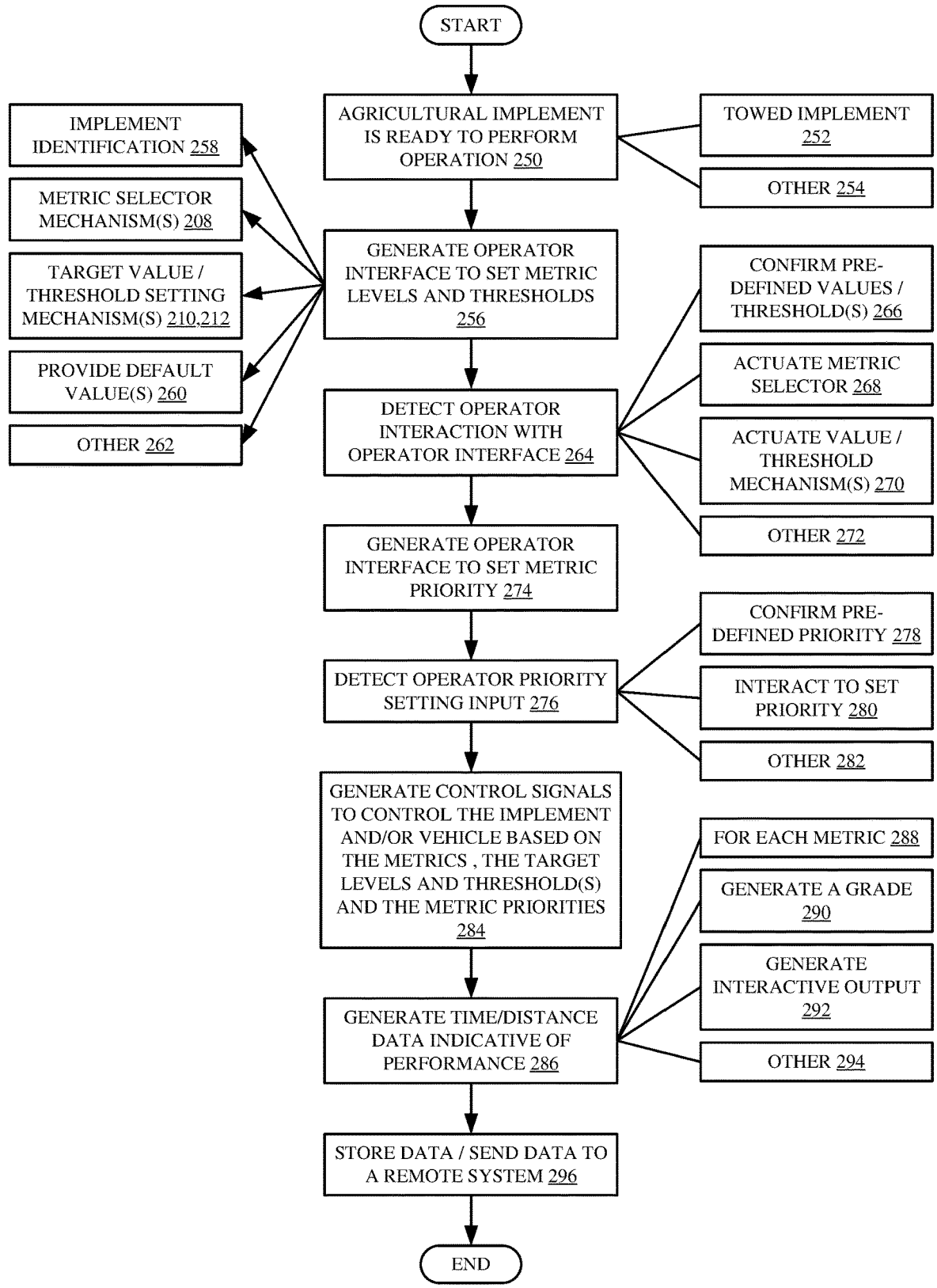
FIG. 3 is a flow diagram illustrating one example of the operation of the architecture illustrated in FIG. 1.
Figure 4A:
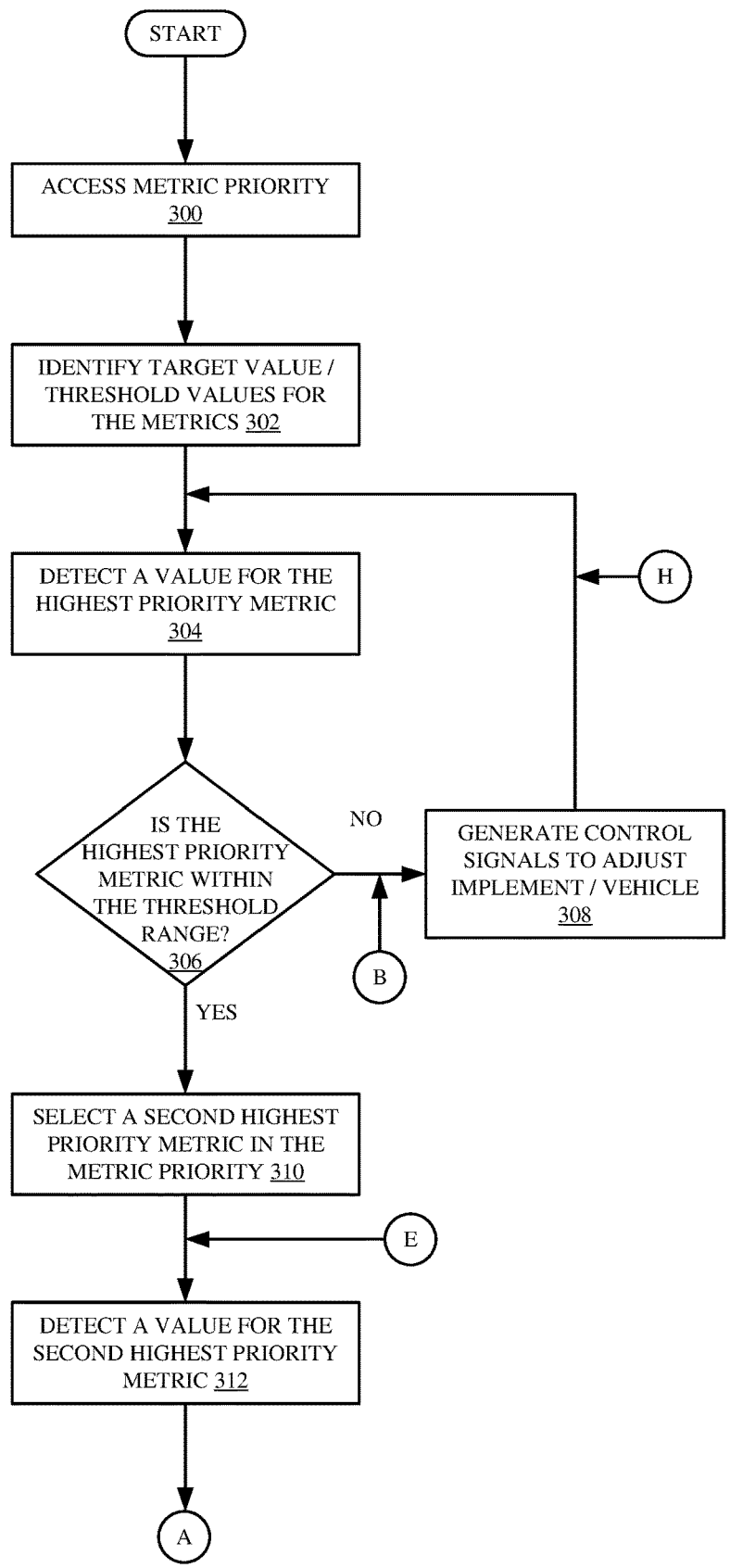
FIGS. 4A-4D (collectively referred to herein as FIG. 4) illustrate a flow diagram showing one example of the operation of the architecture illustrated in FIG. 1, in more detail.
Figure 4B:
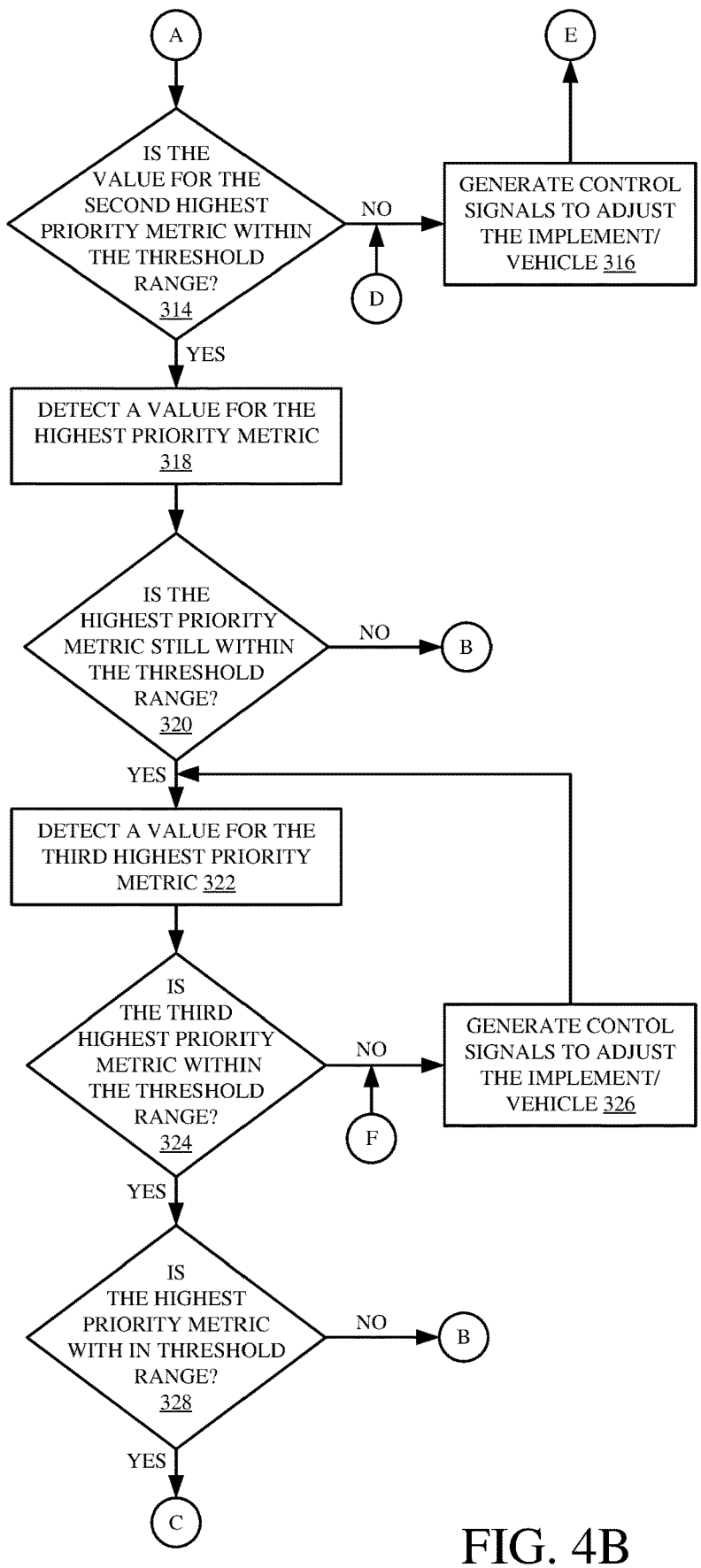
Figure 4C:
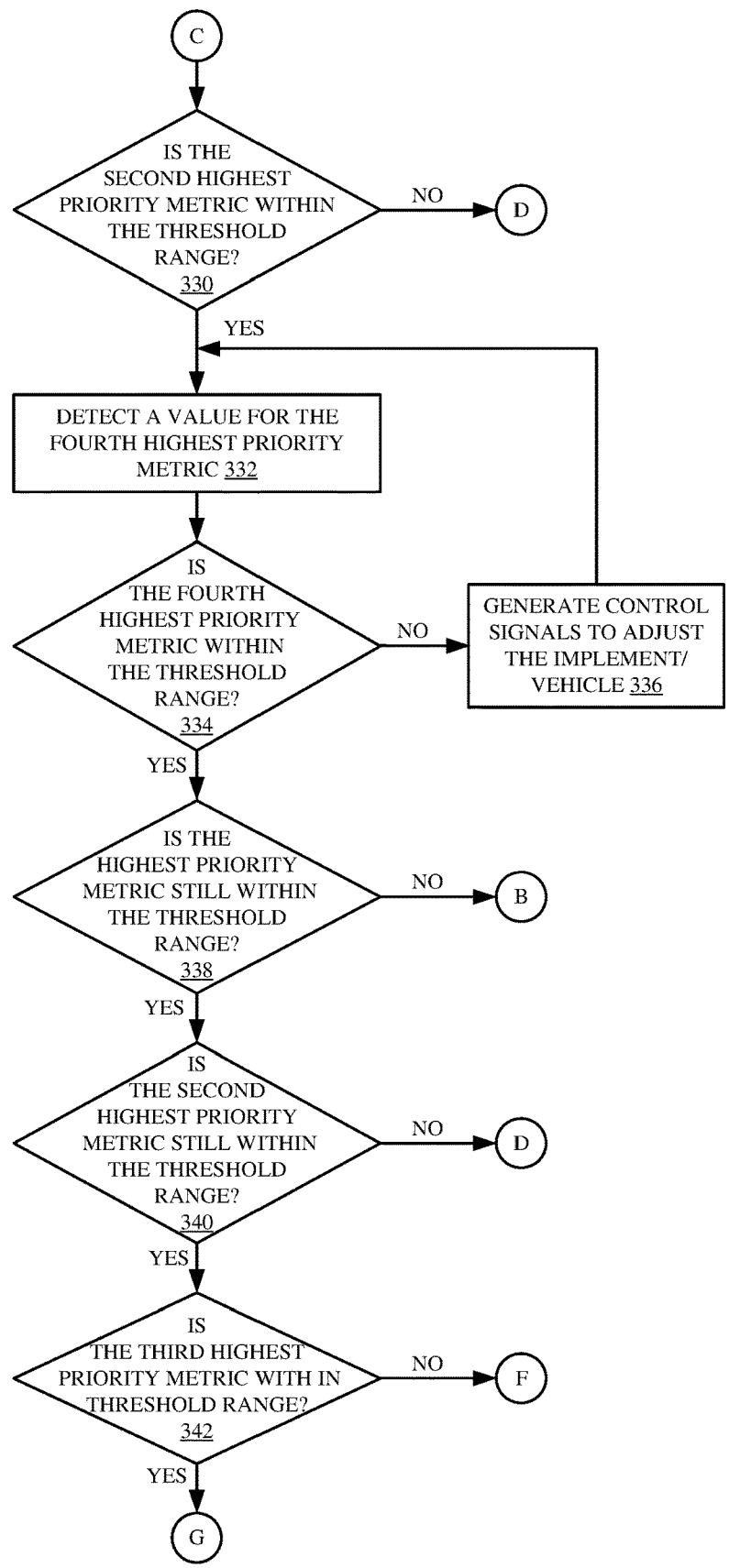
Figure 4D:
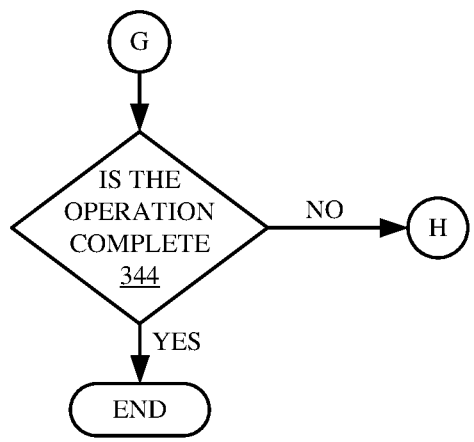

FIG. 3 is a flow diagram illustrating one example of the overall operation of architecture 100 in controlling implement 104 and tractor 102 based upon a metric priority that can be set by the operator, or that can be predefined. It is first assumed that the agricultural implement 104 is ready to perform an operation in a field. This is indicated by block 250 in the flow diagram of FIG. 3. It will be noted that, while the previous examples mention a towed agricultural implement 252, the implement could be carried by the towing (or support) vehicle 102 in other ways as well, and this is indicated by block 254.

Metric setting logic 152 then controls user interface generation logic 160 to generate an operator interface that enables operator 108 to set the metric levels and threshold levels for each of the metrics that are to be used in controlling the implement. In one example, prior to generating the metric setting user interface 166, metric setting logic 152 identifies which particular implement it is to control. It can be performed by querying a control system on agricultural implement 104 to obtain its identity (e.g., model number, configuration, etc.) or by querying implement 104 in another way to determine what type of implement it is. The identity of implement 104 can be input by the operator 108, or it can be done in other ways. Performing some type of implement identification to identify the particular agricultural implement 104 being controlled is indicated by block 258 in the flow diagram of FIG. 3.

Also, in one example, the metric setting user interface 166 includes a metric selector or metric identification mechanism 208 (also shown in FIG. 2). The metric selector can be a user actuatable button or icon, or another item on the user interface, that allows operator 108 to either select a metric, or to input a metric, or to identify the metric in other ways.

Also, in one example, the metric setting user interface 166 includes target value and threshold setting mechanisms 210 and 212, respectively. The mechanisms 210 and 212 can be mechanisms which allow the operator 108 to select a target value for the identified metric and the thresholds that define the target window for that metric. These can be any of a wide variety of different actuators or user input mechanisms, and they can allow operator 108 to select a value or to input a value in various ways.

Metric setting user interface 166 can also be populated with default values, once the type of implement 104 is known. For instance, it may be that the metrics that are normally used to control implement 104, and the target values and threshold values that are normally used, are retrieved from data store 156 or elsewhere and are prepopulated into the user interface, so that operator 108 can change them, if desired. Populating the user interface with default values is indicated by block 260 in the flow diagram of FIG. 3. Generating the operator interface to set the metric levels and thresholds can be done in a wide variety of other ways as well, and this is indicated by 262.

User interface generation logic 160 then detects operator interaction with the operator interface 166. This is indicated by block 264. In one example, operator 108 may interact with interface 166 to confirm pre-defined or default values and thresholds for a pre-defined set of metrics. This is indicated by block 266. In another example, operator 108 can actuate the metric identification actuator 208 to select a metric. This is indicated by block 268.

Also, in one example, operator 108 can actuate the target level setting actuator 210 and threshold setting actuator 212 to set the target values and threshold values for a selected metric. This is indicated by block 270. The operator action can be detected in a variety of other ways as well, in order to determine what metrics are to be used, and the target values and threshold values for those metrics. This is indicated by block 272.

Once this information is received, target level logic 168 and threshold logic 170 (shown in FIG. 2) illustratively set the target level and threshold levels for the various metrics. In one example, they can be stored in metric/priority data store 156.

Priority setting logic 154 then uses user interface generation logic 160 to generate a user interface 166 that allows operator 108 to set the priority for the various metrics. It will be appreciated that setting the priority can be done through the same interface, and at the same time, as selecting metrics and setting their target values and threshold values. In another example, the priority may be predefined, and in yet another example, the priority can be assigned by operator 108 through a different user interface, or at different time. Generating the operator interface to set the metric priority is indicated by block 274 in the flow diagram of FIG. 3.

User interface generation logic 160 then detects user interaction with that interface, setting the priority for the various metrics to be used in controlling implement 104. Detecting an operator priority setting input is indicated by block 276. In one example, as mentioned above, this can be an operator input that confirms a predefined or default priority. This is indicated by block 278. It can also include operator 108 actuating a priority setting actuator 214 to set the priority of the various metrics. This is indicated by block 280. Detecting the operator priority setting input can be done in other ways as well, and this is indicated by block 282.

Priority control logic 158 then generates control signals to control the implement 104 based upon the selected metrics, the target levels and threshold levels, and the metric priorities for each of the metrics. Generating the control signals to control the implement in this way is indicated by block 284 in the flow diagram of FIG. 3. This is described in greater detail below with respect to FIG. 4.

Implement performance tracking system 162 then generates time and/or distance data corresponding to each of the different metrics to indicate the performance of agricultural implement 104, relative to those metrics. This is indicated by block 286. For instance, metric level tracking and aggregation logic 200 illustratively tracks the amount of time (and/or distance) that implement 104 operated and the aggregate time/distance for the level of each particular metric relative to its target level, and the threshold levels. For instance, it can aggregate the amount of time (and/or distance) that implement 104 operated with respect to the highest priority level metric being at its target level (and/or author its corresponding target range), and the aggregate amount of time that it was not at its target level (and/or within its target range), but was displaced by from its target level (and/or its target range). It can also monitor the amount that it was displaced. It can generate a time and/or geographic record showing when and/or where the metric was at different levels.

For instance, it can monitor the amount of time that the metric had a level that was 10 percent above its target level, 15 percent above its target level, 10 percent below its target level, etc. It can also aggregate the amount of time (and/or distance) that implement 104 operated where the level of the metric was above its target range (and by how much it was above), below its target range (and by how much it was below), etc. These are examples only.

Data store control logic 202 can control data store 156 to store this information corresponding to each metric. Performance search and surfacing logic 204 can surface this performance information for operator 108, or for a different user, and assign an overall evaluation or grade to the performance of implement 104 relative to each metric. The evaluation or grade may be a letter grade, a number grade, a color grade, or any of a wide variety of other indicia which indicates how implement 104 is performing with respect to each metric, given the target level and target range for that metric. It can also provide an evaluation or grade for the overall operation of implement 104, indicative of how it operated relative to all of the metrics, given their priority.

Performance search and surfacing logic 204 can also respond to user queries for the data. It can surface the information to users, even before they query for the data. For instance, if the highest level priority metric is out of its target range, then logic 204 may surface an interactive display for operator 108 so that operator 108 can take action to control implement 104 so that the highest level priority metric moves back within its target range. The action can be automatically taken by the control system as well, with an alert or notification to the operator 108. Logic 204 can also receive user queries for the information and surface and interactive display so that the querying user can interact with the information (such as to drill up or drill down) relative to the displayed information, etc.).

Generating the aggregate time and/or distance data and the evaluation or score with respect to each metric is indicated by block 288. Generating a grade or evaluation for each metric is indicated by block 290. Generating an interactive output is indicated by block 292. It will be appreciated that the data indicative of the performance of implement 104 can be generated and surfaced in a wide variety of other ways as well, and this is indicated by block 294.

Also, once the information is generated, as discussed above, data store control logic 202 can control data store 156 to store that data in data store 156. It can also control communication system 122 to send the information to a remote system 110 (shown in FIG. 1). Storing the data and/or sending the data to a remote system is indicated by block 296 in the flow diagram of FIG. 3.

FIG. 3A shows one example of a user interface display 298 which shows five different metrics, their corresponding priority, their corresponding target levels, and their corresponding high and low threshold levels. In the example shown in FIG. 3A, a first metric is speed (in miles per hour) at which the implement 104 (or vehicle 102) is traveling. It can be seen that the target value is 6 miles per hour and the high and low threshold values are 7 miles per hour and 5 miles per hour, respectively. The metric having the second highest priority in FIG. 3A is fuel consumption (in gallons per acre). It can be seen that the target value has been set to 1, while the high and low threshold values are 1.2 and 0.8, respectively. The metric with the third highest priority is tool depth (in inches). Its target value is 3 inches and the high and low threshold values are 4 inches and 2 inches, respectively. The metric with the fourth highest priority is wheel slip (measured in percent). It has a target value of 10 percent with a high and low threshold value of 15 percent and 5 percent, respectively. The metric with the fifth highest priority is the quality of job (ranked from 1-5). It has a target value of 4 with high and low threshold values of 5 and 3, respectively. It will be noted that these metrics are only an example. Also, the same metrics can be measured in different units. For instance, the speed metric can be measured in terms of coverage, such as in acres per hour. Further, the tool depth metric may have several different categories for machines with different ground engaging groups. Further, one or more tool parameters can be included which may include tool downforce, pressure, angle, etc. All of these and a wide variety of other metrics are contemplated herein.

FIGS. 4A-4D (collectively referred to herein as FIG. 4) show a flow diagram illustrating one example of the operation of implement control system 130 in generating control signals to control implement 104 based upon the metrics, the target levels and threshold, as well as the metric priorities. Thus, FIG. 4 describes the operation discussed above with respect to block 284 in FIG. 3, in more detail. FIG. 4 will be described with reference to the first four metrics illustrated in FIG. 3A, for the same of example only.

It is thus assumed, at the outset, that the metrics used to control implement 104 (speed, fuel consumption, tool depth and wheel slip) have been identified, that their target values and threshold values have been identified, and that the priority has been assigned to each metric. Once that is done, priority accessing logic 190 (shown in FIG. 2) accesses the metric priority for each of the metrics that is to be used in controlling implement 104. Accessing the metric priority is indicated by block 300 in FIG. 4. Metric selection logic 192 then identifies the target value and threshold values for the various metrics that are to be used to control implement 104. This is indicated by block 302. Metric selection logic 192 then selects the highest priority metric (e.g., speed), and measurement logic 194 detects a current level for that metric. If the metric is identified directly by a sensor signal value, then measurement logic 194 obtains the value of that sensor signal (which may be provided by one of sensors 114 or 134). If the metric value is derived from one or more sensor signals, or in another way, then measurement logic 194 derives the current metric value in the desired way.

Once the current value for the highest priority metric (e.g., speed) is identified, then measurement logic 194 compares the current value of the highest priority metric to the target level and target range (or threshold range) to determine whether the highest priority metric has a current value which is within the target range. Detecting the value for the highest priority metric, and determining whether it is in the target range defined by the thresholds, is indicated by blocks 304 and 306 in the flow diagram of FIG. 4.

If, at block 306, it is determined that the highest priority metric (e.g., the speed metric) has a value which is currently not within its target range (e.g., not within 5-7 mph), then control action identifier logic 196 identifies the particular control actions that are to be taken in order to move the metric value back within its target range. This can be done by accessing a mapping between the metric value and the control actions. It can be done using a model, or the actions can be determined dynamically or in other ways. Once the actions are identified, logic 196 provides an output to control signal generator logic 118, which generates the control signals needed to perform the actions identified in order to move the value of the metric back within its target range. It can provide those control signals to controllable subsystems 120 on vehicle 102, or to controllable subsystems 138 on implement 104, or both. For instance, it may control the tractor 102 to increase the throttle setting, or it may control implement 104 to decrease tool depth, or both. Generating control signals to adjust the implement (and/or vehicle) is indicated by block 308. Processing then reverts to block 304 where the current value for the highest priority metric is again measured and it is determined whether it is within its target range. This continues until the highest priority metric is moved back within its target range.

Once measurement logic 194 has determined that sufficient adjustments have been made so that the speed metric is within its target range (within a range of 5-7 miles per hour) then metric selection logic 192 selects the second highest priority metric for evaluation. In the example shown in FIG. 3A, it selects the fuel consumption metric. Measurement logic 194 then identifies a current value for the fuel consumption of vehicle 102. Selecting the second highest priority metric is indicated by block 310, and detecting a current value for the second highest priority metric is indicated by block 312.

Measurement logic 194 then determines whether the fuel consumption metric has a current value which is within the target range defined by the high and low threshold values (e.g., defined by 1.2 and 0.8 gallons per acre, respectively). This is indicated by block 314 in the flow diagram of FIG. 4. If not, then control action identifier logic 196 identifies control actions that can be taken in order to move the fuel consumption metric within its target window. For instance, if the fuel consumption is above the high threshold value, this may mean that the tool depth should be slightly decreased in order to increase the fuel consumption, while maintaining the current speed. Once control action identifier logic 196 identifies the control actions to be taken, it provides an output indicative of this to control signal generator logic 118, which generates control signals to controllable subsystems 120 and/or controllable subsystems 138 to implement those actions. For instance, if the control action is to decrease the tool depth, then control signal generator logic 118 provides a control signal to controllable subsystems 138 on implement 104 which will cause implement 104 to decrease the engagement depth of the tool, with the soil. Generating the control signals to adjust the implement is indicated by block 316 in FIG. 4.

Once implement 104 and/or vehicle 102 are controlled so that the second highest priority metric is within its target range, then metric selection logic 192 again selects the highest priority metric (speed) and detects a value for the highest priority metric. This is indicated by block 318. This is to ensure that, in adjusting implement 104 to bring the second highest priority metric within its target range, this did not take the highest priority metric out of its target range.

Therefore, at block 320, measurement logic 194 determines whether the highest priority metric is still within its target range. If not, processing reverts to block 308 where implement 104 is again adjusted to bring the highest priority metric into its target range.

However, if, at block 320, measurement logic 194 determines that the highest priority metric is still within its target range (and now having the second highest priority metric also within its target range), metric selection logic 192 selects the third highest priority metric (e.g., tool depth in the example shown in FIG. 3A). This is indicated by block 322 in the flow diagram of FIG. 4.

Measurement logic 194 then obtains a current value for the tool depth metric and determines whether that value is within the threshold range for the tool depth metric. This is indicated by block 324. If the current tool depth is not within the target range, then control action identifier logic 196 identifies control actions that need to be taken to move it within its target range. If it is above the target range, then the control action will be to lower the tool depth. If it is below its target range, then the control action will be to raise the tool depth. Generating control signals to adjust the implement to control it in order to bring the third highest metric into its target range is indicated by block 326.

Once implement 104 is controlled to bring the third highest priority metric into its target range, then metric selection logic 192 again returns to selecting the highest priority metric and measurement logic 194 measures the current value of the highest priority metric to ensure that it is still within its target range. This is indicated by block 328. If the highest priority metric has now moved outside of its target range, then processing again reverts to block 308 where implement 104 (and/or vehicle 102) is again controlled to bring the highest priority metric back within its target range.

However, if, at block 328, it is determined that the highest priority metric logic is still within its target range, then metric selection logic 192 selects the second highest priority metric and measurement logic 194 determines whether the value of the second highest priority metric is still within its target range. This is indicated by block 330 in the flow diagram of FIG. 4. If the second highest priority metric (e.g., fuel consumption) has now moved outside its target range, then processing reverts to block 316 where implement 104 (and/or vehicle 102) is controlled to bring the second highest priority metric back to within its target range.

However, if, at block 330, the second highest priority metric is still within its target range, then metric selection logic 192 selects the fourth highest priority metric (wheel slip) and measurement logic 194 identifies a current value for the wheel slip metric. This is indicated by block 332 in the flow diagram of FIG. 4. As with the three higher priority metrics, measurement logic 194 obtains a current measurement for the wheel slip metric and determines whether it is within its target range. If not, control action identifier logic 196 identifies control actions that need to be taken in order to move it within its target range, and it outputs an indication of this to control signal generator logic 118, which generates control signals to take those actions. The control signals can be to control controllable subsystems 120 on vehicle 102 or controllable subsystems 138 on implement 104, or both. Determining whether the fourth highest priority metric has a value that is within its target range and, if not, generating control signals to control implement 104 (and/or vehicle 102) to bring it within its target range is indicated by blocks 334 and 336 in the flow diagram of FIG. 4.

Once the fourth highest priority metric is within its target range, as indicated by block 334, then metric selection logic 192 again selects the highest priority metric and determines whether it is still within its target range. This is indicated by block 338. If not, processing reverts to block 308 where implement 104 (and/or vehicle 102) is adjusted to again bring the highest priority metric into its target range.

If the highest priority metric is still within its target range, then metric selection logic 192 selects the second highest priority metric and measurement logic 194 determines whether it is still within its target range. This is indicated by block 340. If not, processing reverts to block 316 where implement 104 (and/or vehicle 102) is adjusted to bring the second highest priority metric back within its target range.

If, at block 340, it is determined that the second highest priority metric is still within its target range, then metric selection logic 192 selects the third highest priority metric and measurement logic 194 determines whether the third highest priority metric has a value that is still within its target range. This is indicated by block 342. If not, processing reverts to block 326 where implement 104 (and/or vehicle 102) is controlled to bring the third highest priority metric back within its target range.

If, at block 342, it is determined that the third highest priority metric is still within its target range, then this means that all four of the metrics that are used to control the operation of implement 104 are within their target ranges. At this point, as long as the operation is proceeding, processing can revert to block 304, and continue in the same fashion as discussed above. It will also be noted, however, that if there are more, lower priority metrics that are to be used in controlling the operation of implement 104, then processing can continue from block 342 in the same way as it has above, where the next lowest priority metric is selected, implement 104 (and/or vehicle 102) is controlled to bring the selected metric within its target range, and then the values of the higher priority metrics are again checked (starting with the highest priority metric and continuing in descending order of priority) to make sure that all of the higher priority metrics are still within their target range. If any of them is not, then the operation of implement 104 is controlled (such as by controlling implement 104 and/or vehicle 102) to bring the selected metric back within its target range. Continuing in this manner until the operation is complete is indicated by block 344 in the flow diagram of FIG. 4.

The amount of time that each of the metrics is within their target range, at their target value, or deviate from their target value (and the amount of deviation) can all be tracked, aggregated, and logged by implement performance tracking system 162, as discussed above. That information can then be surfaced, as desired.

Figure 5:
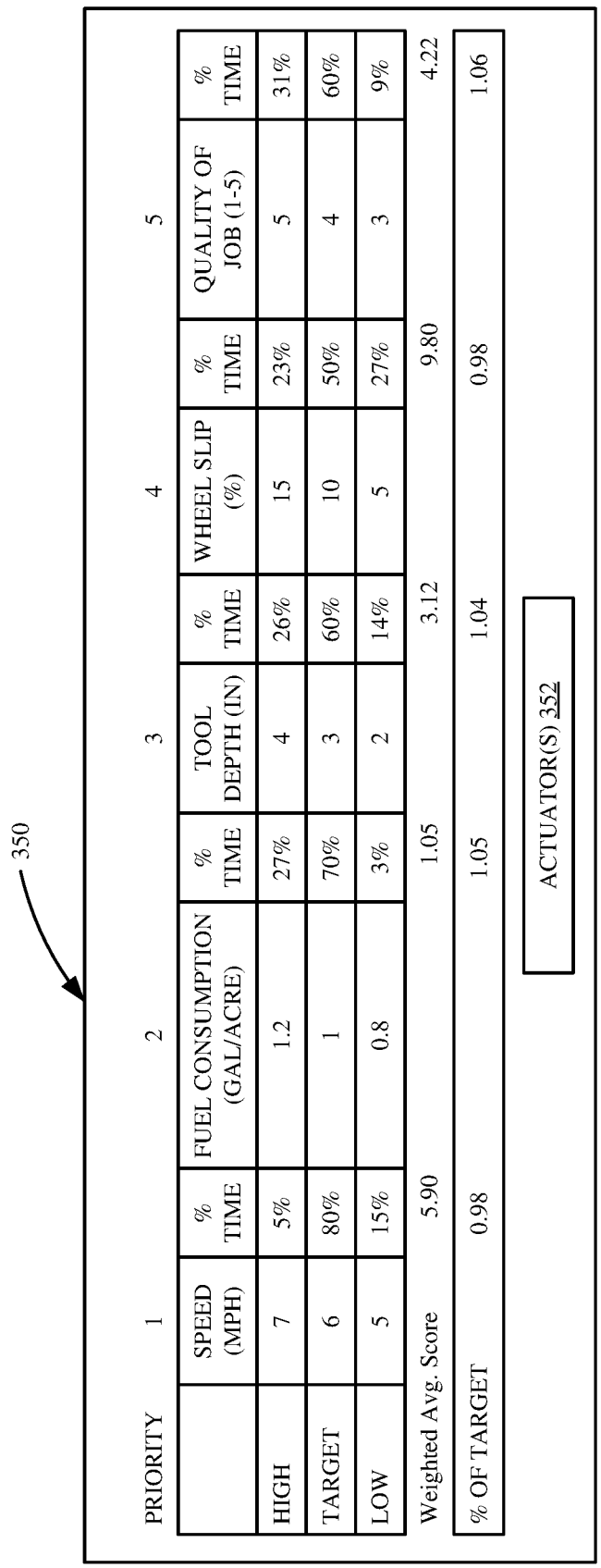
FIG. 5 shows one example of a user interface display that can be generated to surface implement performance.

FIG. 5 is one example of a user interface that can be generated by performance search and surfacing logic 204 in order to surface this information for a user interface 350. It can be seen in FIG. 5 that the top five priority metrics for use in controlling implement 104 are shown, along with the values for their target level and high and low threshold values. Also, a percent of time of operation that the value of each metric was at the target value (within a predefined tolerance), at the high threshold value and at the low threshold value) is indicated. It can be seen in FIG. 5, for instance, that the speed metric was at its target level (of 6 miles per hour plus or minus a given tolerance) for 80 percent of the time. It was at its low threshold value (again within a tolerance) for 15 percent of the time and at its high threshold value for 5 percent of the time.

Aggregation logic 200 has also illustratively computed a score that is a weighted average of the values aggregated for each metric. For instance, the weighted average of the value for the speed metric is 5.9. Aggregation logic 200 has also calculated a score indicative of the percent of the target value that the weighted average represents. For instance, the target value for the speed metric is 6 miles per hour and the weighted average value for the speed metric, during the operation just performed (or being performed) was 5.9. This means that the weighted average of the speed metric is at 98 percent of its target value throughout the operation. The same types of information have been calculated for each of the different metrics. Therefore, the weighted average value for the fuel consumption metric was 105 percent of its target value. The weighted average for the tool depth metric was 104 percent of its target value. The weighted average for the wheel slip metric was at 98 percent of its target value and the weighted average for the quality of job metric was at 106 percent of its target value.

It can be seen in the example shown in FIG. 5 that display 350 can include one or more actuators 352. The actuators 352 can be actuated by a user to interact with display 350. Actuators 352 may, for instance, be drill up/drill down actuators that allow the user to drill down into more detailed information with respect to each metric or a set of metrics (e.g., to see a geographic map or time-based display of how a metric varied, etc.). It may allow them to drill up into more general information about the metrics (such as to see performance across a fleet, etc.). They may be scroll actuators that allow the user to scroll through additional metrics or through metrics for different machines or implements. They may be navigate actuators that allow a user to navigate to other information, among other things.

It will also be appreciated that FIG. 5 is just one example of a user interface display 350. There are a wide variety of different types of user interface displays that can be generated, and the example shown in FIG. 5 is shown for the sake of illustration only.

It can thus be seen that the present description describes controlling an implement according to a metric priority which identifies metrics, assigns them a priority relative to one another, and assigns values indicative of desired performance for each of those metrics. The present description describes controlling the operation of implement 104 (such as by controlling subsystems on implement 104 and/or vehicle 102) in a way that increases the likelihood that the highest priority metrics are maintained at a desired level, and the implement is only adjusted to bring lower priority metrics into a more desired level, so long as the highest priority metrics stay within their desired parameters. In this way, the overall operation of the combined implement 104 and vehicle 102 can be controlled to increase the likelihood that the highest priority control metrics are always within a desired range, and more fine-tuned control, based on the lower priority metrics, is only undertaken so long as the highest priority metrics are maintained within their desired operating ranges.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
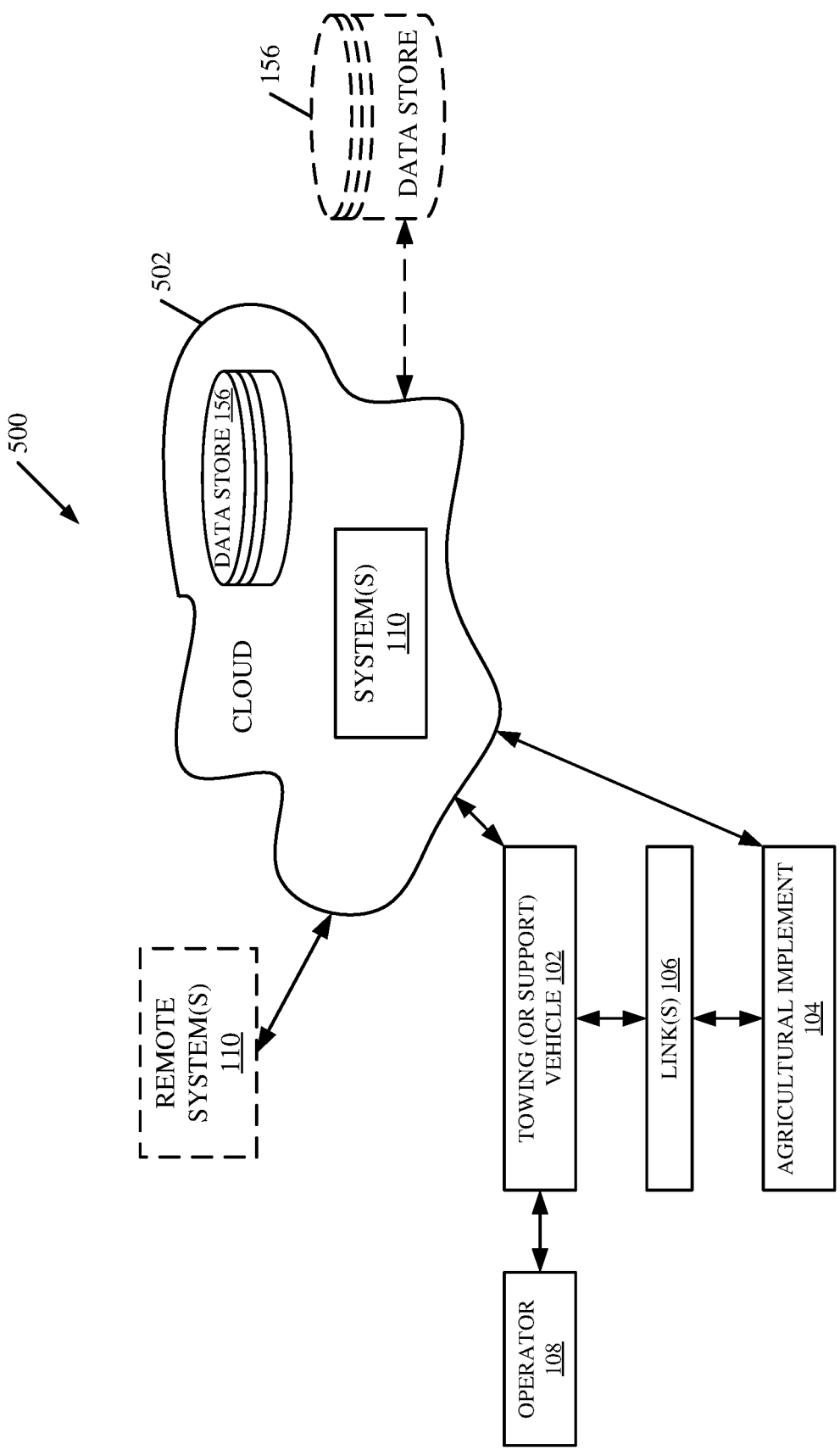
FIG. 6 is a block diagram showing one example of the architecture illustrated in FIG. 1, deployed in a remote server architecture.

FIG. 6 is a block diagram of architecture 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 6, some items are similar to those shown in FIG. 1 and they are similarly numbered. FIG. 6 specifically shows that remote system(s) 100 and data store 156 can be located at a remote server location 502. Therefore, vehicle 102 and/or implement 104 access those systems through remote server location 502.

FIG. 6 also depicts another example of a remote server architecture. FIG. 6 shows that it is also contemplated that some elements of FIG. 1 are disposed at remote server location 502 while others are not. By way of example, remote systems 110 and data store 156 can be disposed at a location separate from location 502, and accessed through the remote server at location 502. Regardless of where they are located, they can be accessed directly by vehicle 102 and/or implement 104, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the vehicle 102 comes close to the fuel truck for fueling, the system automatically collects the information from the vehicle 102 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the vehicle 102 until the vehicle 102 enters a covered location. The vehicle 102, itself, can then send the information to the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
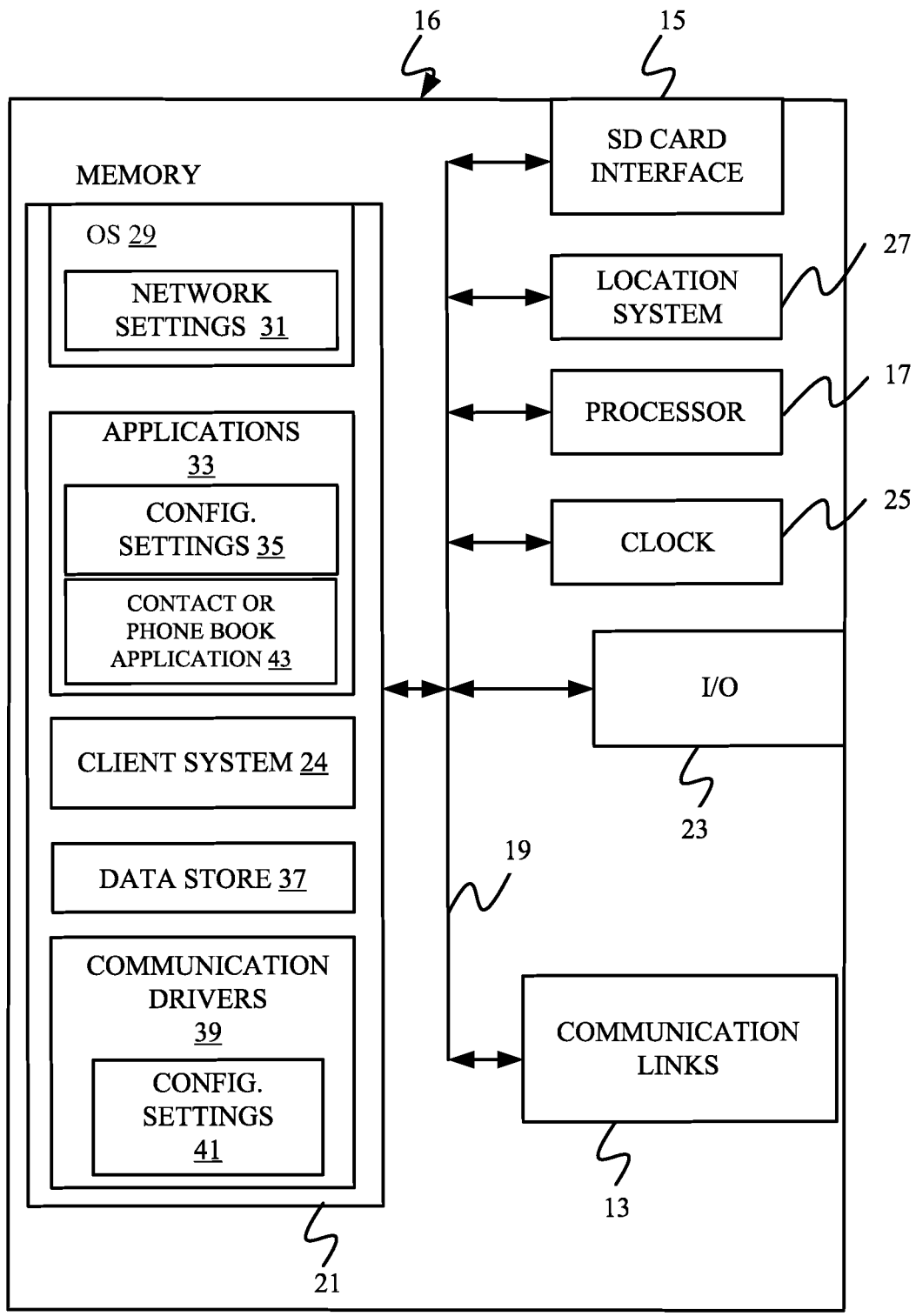
FIGS. 7-9 show examples of mobile devices that can be used in the architectures shown in the previous Figures.
Figure 8:
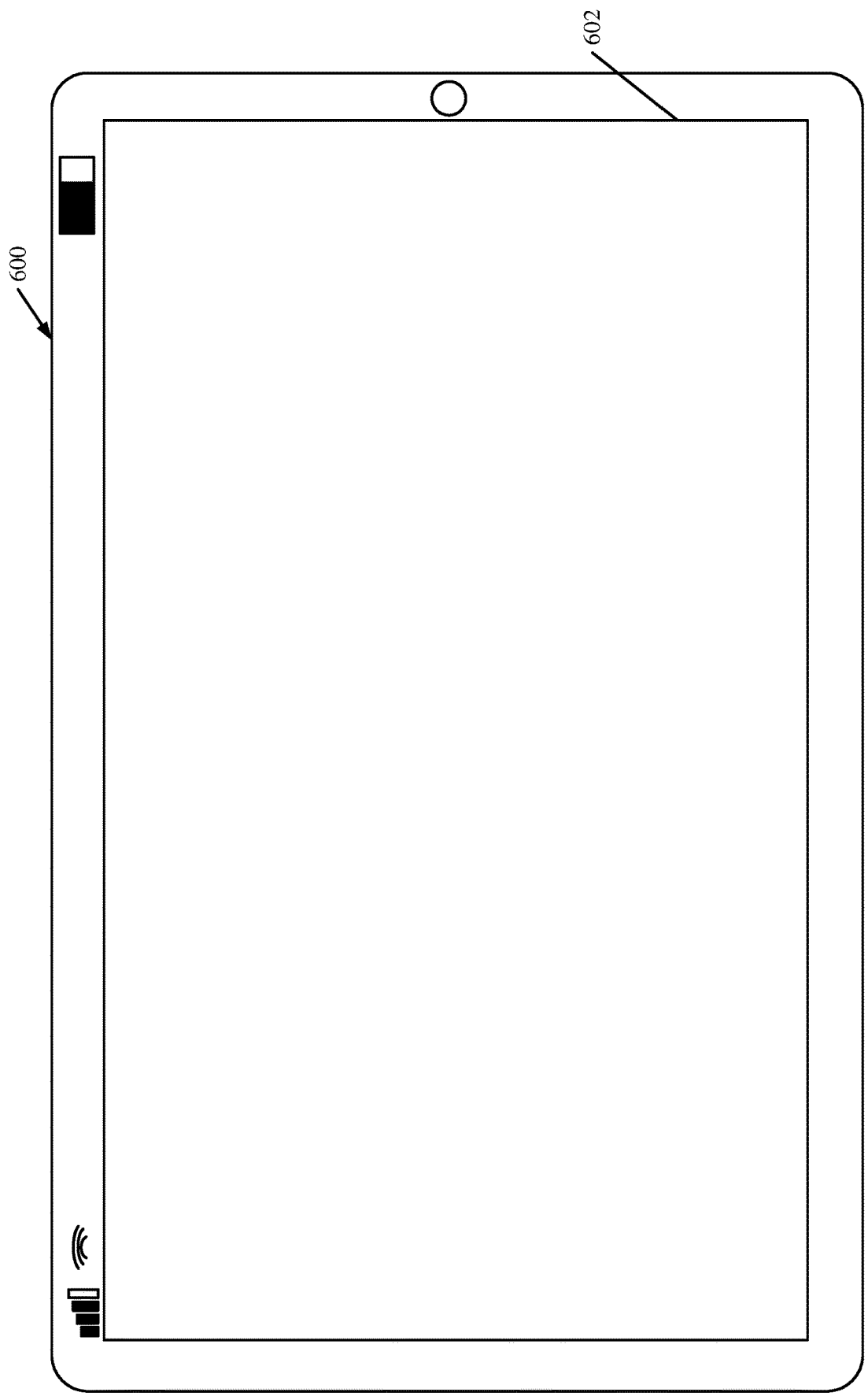
Figure 9:
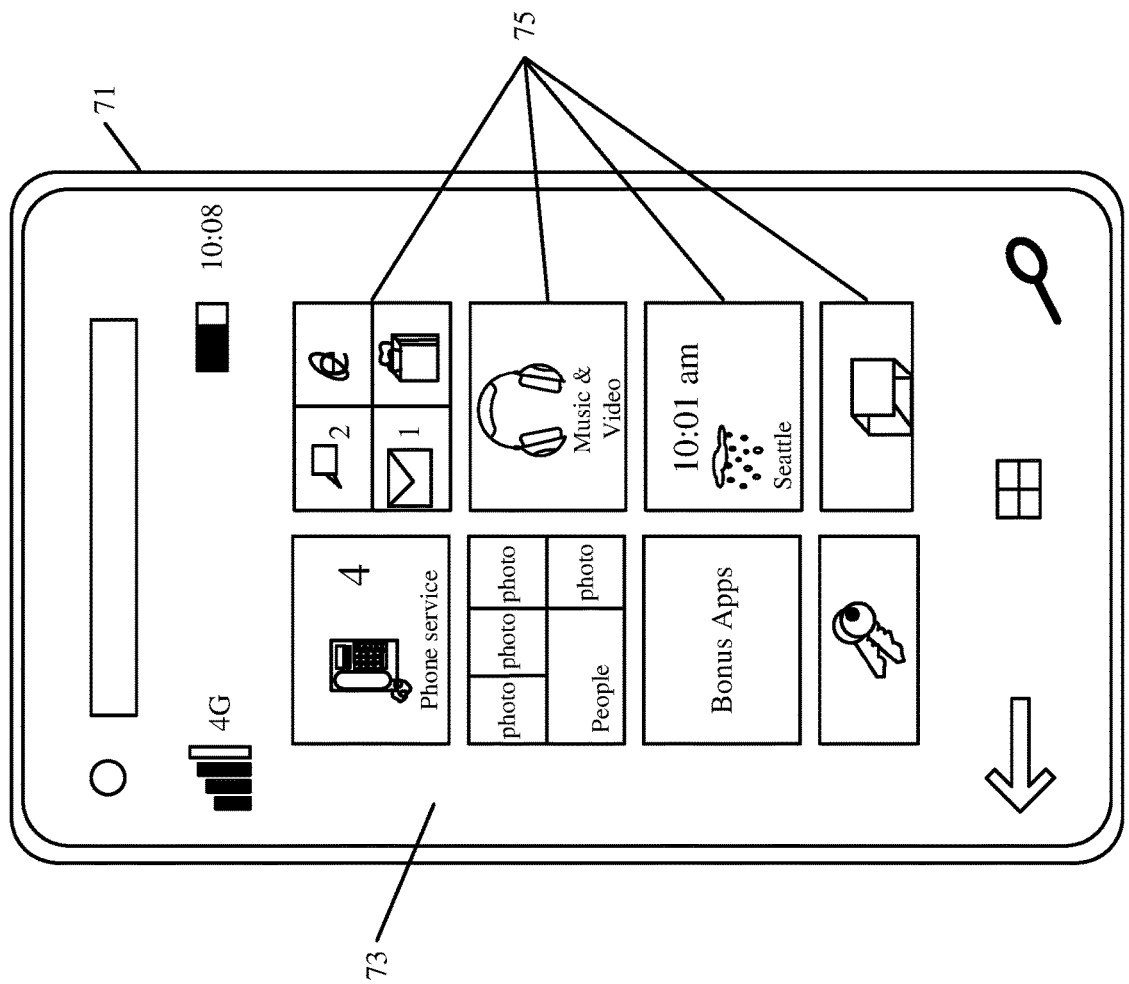

FIG. 7 is a simplified block diagram of one illustrative example of a handheld or mobile computing device that can be used as a user's or client's hand held device 16, in which the present system (or parts of it) can be deployed. For instance, a mobile device can be deployed in the operator compartment of vehicle 102 for use in generating, processing, or displaying the data discussed above. FIGS. 8-9 are examples of handheld or mobile devices.

FIG. 7 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous Figures.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 8 shows one example in which device 16 is a tablet computer 600. In FIG. 8, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
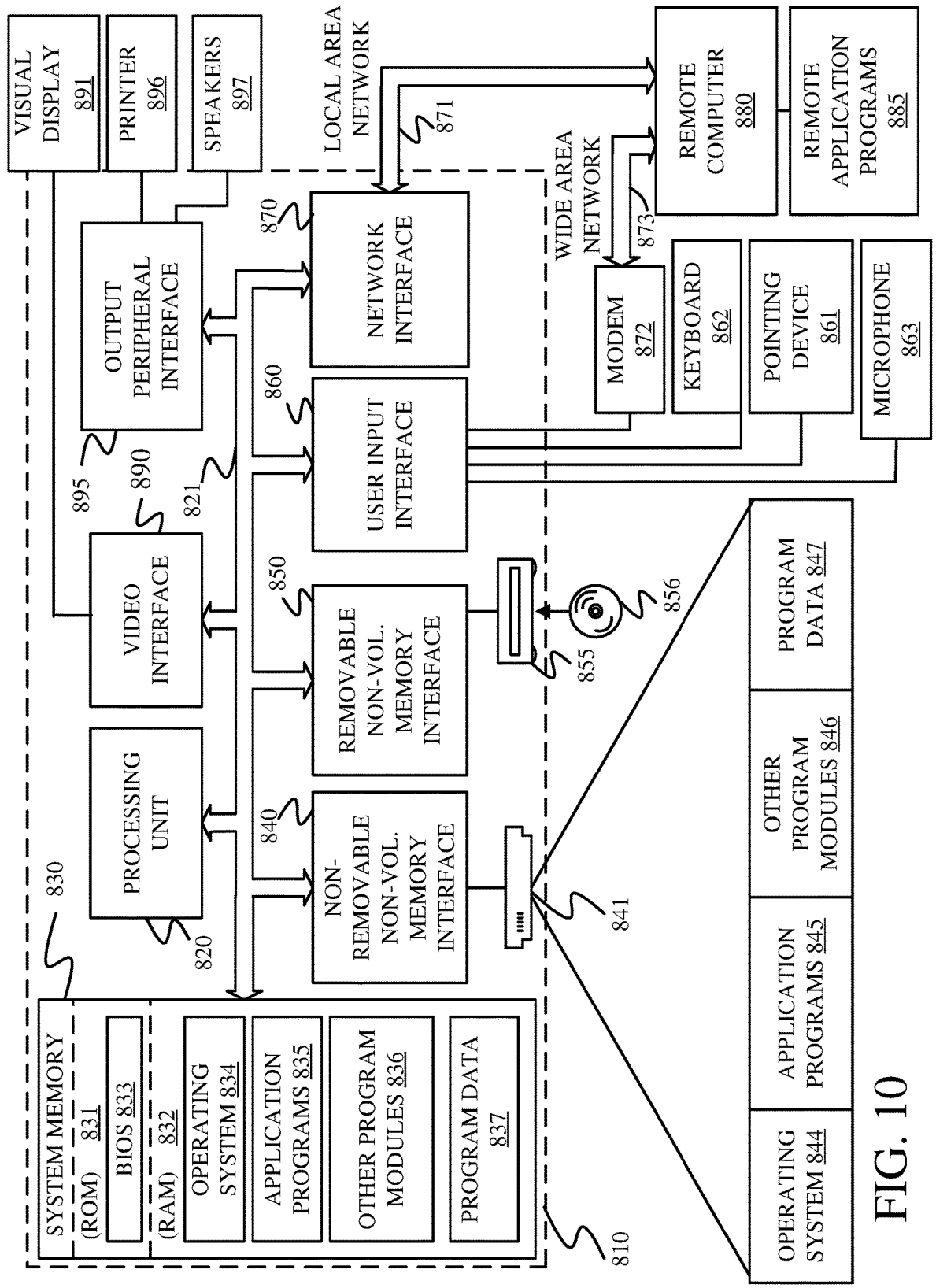
FIG. 10 is a block diagram showing one example of a computing environment that can be used in the architectures shown in the previous Figures.

FIG. 10 is one example of a computing environment in which elements of FIG. 1, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 can be operated in a networked environment using logical connections (such as a local area network—LAN, or wide area network WAN or a controller area network CAN) to one or more sensors or other items, including remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a method of controlling an operation performed by an agricultural implement and a support vehicle, comprising:

receiving a set of metric setting operator inputs that identify a priority of each of a plurality of different metrics, used to control operation of the agricultural implement, relative to other metrics in the plurality of metrics; and performing control actions to control the agricultural implement to keep values, corresponding at least some of the plurality of metrics, in descending order of priority, within a target range of a corresponding target value for each of the plurality of metrics.

Example 2 is the method of any or all previous examples wherein receiving the set of metric setting operator inputs comprises:

detecting a user target value setting input identifying the target value for each of the plurality of metrics.

Example 3 is the method of any or all previous examples wherein receiving the set of metric setting operator inputs comprises:

detecting a user threshold value setting input identifying a set of threshold values corresponding to each of the plurality of metrics, the set of threshold values defining the target range for the corresponding metric.

Example 4 is the method of any or all previous examples wherein performing control actions comprises:

identifying control actions to take to preferentially keep the value corresponding to a higher priority metric, that has a higher priority than a lower priority metric, within the corresponding target range for the higher priority metric, relative to the lower priority metric; and generating control signals to control controllable subsystems to implement the identified control actions.

Example 5 is the method of any or all previous examples wherein performing control actions comprises:

selecting a metric having a corresponding priority;

determining whether the value of the selected metric is within the target range corresponding to the selected metric; and if not, performing control actions to bring the value of the selected metric within the target range corresponding to the selected metric.

Example 6 is the method of any or all previous examples wherein performing control actions comprises:

after performing control actions, performing additional control actions to bring, in descending order of priority, any higher priority metrics, that have values outside the corresponding target range, within the target range corresponding to those higher priority metrics.

Example 7 is the method of any or all previous examples wherein performing additional control actions comprises:

repeating, for the higher priority metrics, in descending order of priority, the steps of:

selecting one of the higher priority metrics;

checking the value for the selected higher priority metric to determine whether it is within its corresponding target range; and if the value for the selected higher priority metric is not within the corresponding target range, then making adjustments to the operation to bring the value of the selected higher priority metric within its corresponding target range.

Example 8 is the method of any or all previous examples and further comprising:

aggregating an amount of time or distance covered where each of the plurality of metrics is within the corresponding target range;

generating a performance score based on performance of the agricultural implement and support vehicle based on the aggregated time or distance covered corresponding to the plurality of metrics.

Example 9 is an agricultural implement control system, comprising:

priority setting logic that receives a set of priority setting operator inputs that identify a priority of each of a plurality of different metrics, used to control operation of the agricultural implement, relative to other metrics in the plurality of metrics; and priority control logic that performs control actions to control the agricultural implement to keep values, corresponding at least some of the plurality of metrics, in descending order of priority, within a target range of a corresponding target value for each of the plurality of metrics.

Example 10 is the agricultural implement control system of any or all previous examples and further comprising:

target level logic configured to detect a user target value setting input identifying the target value for each of the plurality of metrics.

Example 11 is the agricultural implement control system of any or all previous examples and further comprising:

threshold logic configured to detect a user threshold value setting input identifying a set of threshold values corresponding to each of the plurality of metrics, the set of threshold values defining the target range for the corresponding metric.

Example 12 is the agricultural implement control system of any or all previous examples wherein the priority control logic comprises:

control action identifier logic configured to identify control actions to take to preferentially keep the value corresponding to a higher priority metric, that has a higher priority than a lower priority metric, within the corresponding target range for the higher priority metric, relative to the lower priority metric.

Example 13 is the agricultural implement control system of any or all previous examples and further comprising:

control signal generator logic configured to generate control signals to control controllable subsystems to implement the identified control actions.

Example 14 is the agricultural implement control system of any or all previous examples wherein the priority control logic comprises:

metric selection logic configured to select a metric having a corresponding priority; and measurement logic configured to determine whether the value of the selected metric is within the target range corresponding to the selected metric wherein, if not, the control action identifier logic is configured to identify control actions to bring the value of the selected metric within the target range corresponding to the selected metric and wherein the control signal generator logic is configured to generate control signals to implement the control actions that are identified to bring the value of the selected metric within the target range corresponding to the selected metric.

Example 15 is the agricultural implement control system of any or all previous examples wherein, after performing the control actions, the control action identifier logic is configured to identify additional control actions to bring, in descending order of priority, any higher priority metrics, that have values outside the corresponding target range, within the target range corresponding to those higher priority metrics.

Example 16 is the agricultural implement control system of any or all previous examples wherein the priority control logic is configured to identify the additional control actions by repeating, for the higher priority metrics, in descending order of priority, the selecting of one of the higher priority metrics, checking the value for the selected higher priority metric to determine whether it is within its corresponding target range; and if the value for the selected higher priority metric is not within the corresponding target range, then making adjustments to the operation to bring the value of the selected higher priority metric within its corresponding target range.

Example 17 is an agricultural implement control system, comprising:

metric setting logic that receives a set of metric setting operator inputs that identify a set of a plurality of metrics used to control operation of the agricultural implement, a target value corresponding to each of the plurality of metrics, and a metric priority that identifies a priority of each metric relative to other metrics in the plurality of metrics;

priority control logic that identifies control actions to take to preferentially bring a value for a higher priority metric within a corresponding target range of the target value corresponding to the higher priority metric, relative to a lower priority metric; and control signal generator logic that generates control signals to control controllable subsystems to implement the identified control actions.

Example 18 is the agricultural implement control system of any or all previous examples wherein the priority control logic comprises:
metric selection logic configured to select a highest priority metric; and
measurement logic configured to identify a current value for the highest priority metric and determine whether the current value for the highest priority metric is within the corresponding target range.

Example 19 is the agricultural implement control system of any or all previous examples wherein the priority control logic comprises:
control action identifier logic configured to identify, as the identified control actions, actions to bring the value for the highest priority metric within the corresponding target range.

Example 20 is the agricultural implement control system of any or all previous examples wherein the metric identifier logic is configured to, when the value for the highest priority metric is within its corresponding target range, select a second highest priority metric, the measurement logic being configured to determine whether the second highest priority metric is within its corresponding target range and, if not, the control action identifier being configured to identify a control action to bring the value of the second highest priority metric within the corresponding target range.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A control system for an agricultural machine, the control system comprising:
    a processor; and
    memory storing instructions executed by the processor, wherein the instructions, when executed, cause the control system to:
        generate a metric priority that identifies a first metric as higher priority than a second metric, wherein
            the first metric has a corresponding first value representing a first operation of the agricultural machine, and
            the second metric has a corresponding second value representing a second operation of the agricultural machine;
        generate a first target range of the first value;
        generate a second target range of the second value; and
        control the agricultural machine to keep the second value, corresponding to the second metric, within the second target range while maintaining the first value corresponding to the first metric within the first target range.

2. The control system of claim 1, wherein the instructions cause the control system to:
    receive metric setting user input and target range user input;
    generate the metric priority based on the metric setting user input; and
    generate the first and second target ranges based on the target range user input.

3. The control system of claim 2, wherein the instructions cause the control system to:
    generate a user interface that includes one or more user input mechanisms; and
    receive the metric setting user input and the target range user input through the one or more user input mechanisms.

4. The control system of claim 1, wherein the instructions cause the control system to:
    identify control actions to preferentially keep the first and second values within the respective first and second target ranges in descending order of the metric priority; and
    generate control signals to control controllable subsystems to implement the identified control actions.

5. The control system of claim 1, wherein the instructions cause the control system to:
    determine whether the first value corresponding to the first metric is within the first target range; and
    based on determining that the first value is not within the first target range, perform a first control action to bring the first value within the first target range.

6. The control system of claim 5, wherein the instructions cause the control system to:
    after performing the first control action, determine whether the second value corresponding to the second metric is within the second target range; and
    based on determining the second value is not within the second target range, perform a second control action to bring the second value within the second target range.

7. The control system of claim 1, wherein the instructions cause the control system to:
    aggregate an amount of time or distance corresponding to operation of the agricultural machine where each the first value and the second value is within the corresponding first target range and second target range; and
    generate a performance score based on the aggregated time or distance covered corresponding to the first metric and the second metric.

8. A method of controlling an operation performed by an agricultural machine, the method comprising:
    generating a metric priority that identifies a first metric as higher priority than a second metric, wherein
        the first metric comprises a corresponding first value representing a first operation of the agricultural machine, and
        the second metric having a corresponding second value representing a second operation of the agricultural machine;
    generating a first target range of the first value;
    generating a second target range of the second value; and
    controlling the agricultural machine to keep the second value, corresponding to the second metric, within the second target range while maintaining the first value corresponding to the first metric within the first target range.

9. The method of claim 8, and further comprising:
    receiving metric setting user input and target range user input;
    generating the metric priority based on the metric setting user input; and
    generating the first and second target ranges based on the target range user input.

10. The method of claim 9, and further comprising:
    generating a user interface that includes one or more user input mechanisms; and
    receiving the metric setting user input and the target range user input through the one or more user input mechanisms.

11. The method of claim 8, and further comprising:
identifying control actions to preferentially keep the first and second values within the respective first and second target ranges in descending order of the metric priority; and generating control signals to control controllable subsystems to implement the identified control actions.

12. The method of claim 8, and further comprising:
determining whether the first value corresponding to the first metric is within the first target range; and based on determining the first value is not within the first target range, performing a first control action to bring the first value within the first target range.

13. The method of claim 12, and further comprising:
after performing the first control action, determining whether the second value corresponding to the second metric is within the second target range; and based on determining the second value is not within the second target range, performing a second control action to bring the second value within the second target range.

14. The method of claim 8, and further comprising:
aggregating an amount of time or distance corresponding to operation of the agricultural machine where each the first value and the second value is within the corresponding first target range and second target range; and generating a performance score based on the aggregated time or distance covered corresponding to the first metric and the second metric.

15. An agricultural implement control system comprising:
metric setting logic configured to:
  generate a metric priority that identifies a first metric as higher priority than a second metric, wherein
    the first metric comprises a corresponding first value representing a first operation of an agricultural implement, and
    the second metric having a corresponding second value representing a second operation of the agricultural implement;
  generate a first target range of the first value;
  generate a second target range of the second value; and
a control signal generator configured to control the agricultural implement to keep the second value, corresponding to the second metric, within the second target range while maintaining the first value corresponding to the first metric within the first target range.

16. The agricultural implement control system of claim 15, wherein the metric setting logic is configured to:
receive metric setting user input and target range user input;
generate the metric priority based on the metric setting user input; and
generate the first and second target ranges based on the target range user input.

17. The agricultural implement control system of claim 16, and further comprising:
user interface generation logic configured to:
  generate a user interface that includes one or more user input mechanisms; and
  receive the metric setting user input and the target range user input through the one or more user input mechanisms.

18. The agricultural implement control system of claim 15, and further comprising:
priority control logic configured to:
  identify control actions to preferentially keep the first and second values within the respective first and second target ranges in descending order of the metric priority; and
  generate control signals to control controllable subsystems to implement the identified control actions.

19. The agricultural implement control system of claim 15, and further comprising:
an implement performance tracking system configured to:
  determine whether the first value corresponding to the first metric is within the first target range; and
  if the first value is not within the first target range, identify a first control action to bring the first value within the first target range.

20. The agricultural implement control system of claim 19, wherein the implement performance tracking system is configured to:
after performing the first control action, determine whether the second value corresponding to the second metric is within the second target range; and
if the second value is not within the second target range, identify a second control action to bring the second value within the second target range.

* * * * *